United States Patent
Krishnan et al.

(10) Patent No.: US 11,716,396 B1
(45) Date of Patent: Aug. 1, 2023

(54) SYSTEM AND METHOD FOR PROVIDING UNIQUE IDENTIFIERS FOR USE WITH ENTERPRISE APPLICATION ENVIRONMENTS

(71) Applicant: Oracle International Corporation, Redwood Shores, CA (US)

(72) Inventors: Balaji Krishnan, Pleasanton, CA (US); Junsheng Du, Encino, CA (US); Prasenjit Gayen, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/588,915

(22) Filed: Jan. 31, 2022

(65) Prior Publication Data
US 2023/0062097 A1    Mar. 2, 2023

Related U.S. Application Data (60) Provisional application No. 63/237,966, filed on Aug. 27, 2021.

(51) Int. Cl.
*H04L 67/146* (2022.01)
*H04L 67/01* (2022.01)
*H04L 67/133* (2022.01)

(52) U.S. Cl.
CPC .............. *H04L 67/146* (2013.01); *H04L 67/01* (2022.05); *H04L 67/133* (2022.05)

(58) Field of Classification Search
CPC ....... H04L 67/146; H04L 67/01; H04L 67/133
See application file for complete search history.

(56) References Cited

U.S. PATENT DOCUMENTS

| | | | |
|---|---|---|---|
| 8,316,213 B1* | 11/2012 | Sorenson, III et al. ..................... H04L 67/1097 711/216 |
| 9,430,490 B1* | 8/2016 | Lewis ................ G06F 16/1748 |
| 9,612,815 B1* | 4/2017 | Jagtap et al. ......... G06F 16/283 |
| 9,641,598 B1 | 5/2017 | Yuhan |
| 9,787,671 B1* | 10/2017 | Bogrett ................. H04L 67/60 |
| 9,811,684 B1* | 11/2017 | Sterling et al. .... H04L 63/0807 |

(Continued)

FOREIGN PATENT DOCUMENTS

| | | |
|---|---|---|
| WO | 2017120570 | 7/2017 |
| WO | 2019134226 | 7/2019 |

(Continued)

OTHER PUBLICATIONS

GARCIA, RUBEN J., "How to log your requests with Spring Boot Microservices - Part 1", 5 pages, retrieved Oct. 4, 2021 from: <https://rubenjgarcia.cloud/log-requests-spring-boot-microservices/>.

(Continued)

*Primary Examiner* — Blake J Rubin
(74) *Attorney, Agent, or Firm* — TUCKER ELLIS LLP (57) ABSTRACT

In accordance with an embodiment, described herein is a system and method for providing unique identifiers for use with enterprise software application environments. A unique ID server (service) operates to provide calling applications with unique identifiers, for use by the applications in storing, accessing, or using data stored at a database or data warehouse. A database sequence provided by the database can be leveraged for issuing unique ID sequences for use by the applications. A calling application can reserve and/or request, via the unique ID service, sequences of unique IDs, ahead of time, either as a single sequence or bulk sequence. The unique ID can be subsequently used within the enterprise application environment for various purposes.

20 Claims, 10 Drawing Sheets

(56) References Cited

U.S. PATENT DOCUMENTS

| | | | |
|---|---|---|---|
| 11,010,191 B1* | 5/2021 | Hornbeck | H04L 67/133 |
| 11,095,506 B1* | 8/2021 | Erblat et al. | H04L 41/082 |
| 2007/0276833 A1* | 11/2007 | Sen et al. | G06F 16/22 |
| 2009/0030975 A1 | 1/2009 | Gupta | |
| 2010/0241804 A1* | 9/2010 | Parthasarathy et al. | G06F 12/0875 711/E12.017 |
| 2012/0011096 A1* | 1/2012 | Aggarwal | G06F 16/2379 707/602 |
| 2012/0254949 A1 | 10/2012 | Mikkonen et al. | |
| 2017/0223003 A1* | 8/2017 | Miles et al. | G06F 21/6254 |
| 2017/0364601 A1* | 12/2017 | Charles et al. | G06Q 10/10 |
| 2017/0371716 A1* | 12/2017 | Gujar et al. | G06F 9/5077 |
| 2018/0234356 A1* | 8/2018 | Johnsen et al. | H04L 49/15 |
| 2019/0372924 A1* | 12/2019 | Waltz et al. | G06F 16/2282 |
| 2020/0050608 A1* | 2/2020 | Zhao et al. | G06F 9/541 |
| 2020/0104389 A1* | 4/2020 | Mietke | G06F 16/217 |
| 2021/0027115 A1* | 1/2021 | Davis et al. | G06F 3/0689 |
| 2021/0112059 A1* | 4/2021 | Heldman et al. | H04L 67/10 |
| 2021/0133340 A1* | 5/2021 | Solotorevsky | G06F 21/44 |
| 2021/0349870 A1* | 11/2021 | Mangayil et al. | H04L 63/101 |
| 2022/0253788 A1* | 8/2022 | Hingne et al. | G06Q 10/06398 |

FOREIGN PATENT DOCUMENTS

| | | |
|---|---|---|
| WO | 2020049215 | 3/2020 |

OTHER PUBLICATIONS

MARQUARDT, ALEXANDER, "Generating Globally Unique Identifiers for Use with MongoDB", Feb. 14, 2017, updated Mar. 4, 2021, 8 pages, retrieved on Oct. 4, 2021 from: <https://www.mongodb.com/blog/post/generating-globally-unique-identifiers-for-use-with-mongodb>.

SALESFORCE, Heroku Dev Center, "HTTP Request IDs", last updated May 27, 2020, 7 pages, retrieved Oct. 4, 2021 from: <https://devcenter.heroku.com/articles/http-request-id>.

"Assign a unique id to every request in a spring-based web application", 6 pages, retrieved Oct. 4, 2021 from: <https://stackoverflow.com/questions/18823241/assign-a-unique-id-to-every-request-in-a-spring-based-web-application>.

* cited by examiner

SYSTEM AND METHOD FOR PROVIDING UNIQUE IDENTIFIERS FOR USE WITH ENTERPRISE APPLICATION ENVIRONMENTS

CLAIM OF PRIORITY

This application claims the benefit of priority to U.S. Provisional Pat. Application titled "SYSTEM AND METHOD FOR PROVIDING UNIQUE IDENTIFIERS FOR USE WITH ENTERPRISE APPLICATION ENVIRONMENTS", Application No. 63/237,966, filed Aug. 27, 2021; which above application and the content thereof is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to enterprise software application environments, and are particularly related to a system and method for providing unique identifiers for use with enterprise application environments.

BACKGROUND

Data analytics enables the computer-based examination or analysis of large amounts of data, in order to derive conclusions or other information from that data; while business intelligence tools provide an organization's business users with information describing their enterprise data in a format that enables those business users to make strategic business decisions.

Such data analytics or business intelligence tools can be provided within the context of an organization's enterprise software application environment, such as, for example, an Oracle Fusion Applications environment; or within the context of a software-as-a-service (SaaS) or cloud environment, such as, for example, an Oracle Analytics Cloud environment, which store data in a database for use by various applications.

SUMMARY

In accordance with an embodiment, described herein is a system and method for providing unique identifiers for use with enterprise software application environments. A unique ID server (service) operates to provide calling applications with unique identifiers, for use by the applications in storing, accessing, or using data stored at a database or data warehouse. A database sequence provided by the database can be leveraged for issuing unique ID sequences for use by the applications. A calling application can reserve and/or request, via the unique ID service, sequences of unique IDs, ahead of time, either as a single sequence or bulk sequence. The unique ID can be subsequently used within the enterprise application environment for various purposes.

DETAILED DESCRIPTION

Data analytics enables the computer-based examination or analysis of large amounts of data, in order to derive conclusions or other information from that data; while business intelligence tools provide an organization's business users with information describing their enterprise data in a format that enables those business users to make strategic business decisions.

Such data analytics or business intelligence tools can be provided within the context of an organization's enterprise software application environment, such as, for example, an Oracle Fusion Applications environment; or within the context of a software-as-a-service (SaaS) or cloud environment, such as, for example, an Oracle Analytics Cloud environment, which store data in a database for use by various applications.

Some enterprise application environments, such as for example Oracle Fusion SaaS applications, require the use of a unique identifier (ID) for an application's database tables. Such unique IDs are generally used for the primary key columns, and must be globally unique due to various functional requirements.

In accordance with an embodiment, described herein is a system and method for providing unique identifiers for use with enterprise software application environments. A unique ID server (service) operates to provide calling applications with unique identifiers, for use by the applications in storing, accessing, or using data stored at a database or data warehouse. A database sequence provided by the database can be leveraged for issuing unique ID sequences for use by the applications. A calling application can reserve and/or request, via the unique ID service, sequences of unique IDs, ahead of time, either as a single sequence or bulk sequence. The unique ID can be subsequently used within the enterprise application environment for various purposes.

For example, in accordance with an embodiment, technical advantages of the described approach include that a unique ID can be subsequently used by a calling application within the enterprise application environment as a primary key (e.g., a table column identifier), during access to or insertion of data into enterprise application tables that are stored at a shared database and/or shared by multiple tenants of the enterprise application environment.

Figure 1:
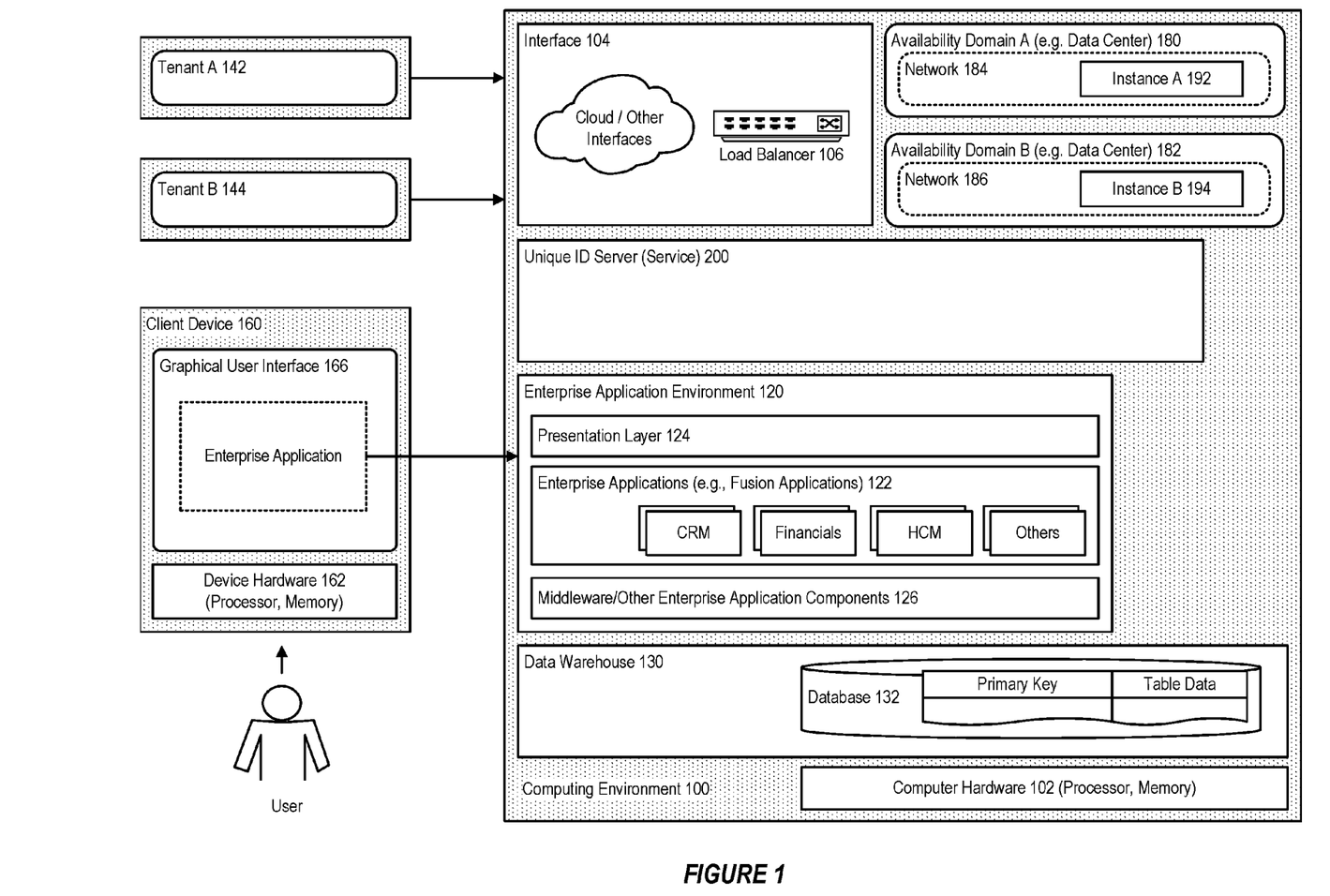
FIG. 1 illustrates a system for providing unique identifiers for use with enterprise application environments, in accordance with an embodiment.

FIG. 1 illustrates a system for providing unique identifiers for use with enterprise application environments, in accordance with an embodiment.

In accordance with an embodiment, the components and processes illustrated in FIG. 1, and as further described herein with regard to various embodiments, can be provided as software or program code executable by a computer system or other type of processing device, for example a cloud computing system.

As illustrated in FIG. 1, in accordance with an embodiment, a cloud, SaaS, or other enterprise-computing environment 100 can operate on a computing infrastructure 102 comprising hardware (e.g., processor, memory), software resources, and one or more cloud or other application program interfaces (API) 104 that provide access to the shared resources via one or more load balancer 106.

In accordance with an embodiment, the environment supports the use of availability domains, such as for example availability domains A 180, and availability domains A B 182, which enables customers to access networks 184, 186, and (e.g., cloud or enterprise application) instances A 192, B 194.

For example, in accordance with an embodiment of a cloud or SaaS environment that supports access by tenants, each tenant A 142, B 144 can create, organize, and administer their cloud resources or instances.

In accordance with an embodiment, a client device, such as, for example, a computing device 160 having a device hardware 162 (e.g., processor, memory), and graphical user interface 166, can enable an administrator or other user to communicate with the environment via a network such as, for example, a wide area network, local area network, or the Internet.

In accordance with an embodiment, the system includes an enterprise application environment 120 (e.g., a Fusion Applications environment) that provides access to a variety of software enterprise applications 122 or other components, such as, for example, customer relationship management (CRM), Financials, human capital management (HCM), or other types of applications or components that can be used to access data stored in a data warehouse 130 or database 132 (for example, in a Fusion Applications environment, an Oracle Fusion Database).

In accordance with an embodiment, the enterprise application environment can include one or more presentation layer 124, or middleware/other enterprise application components 126 that facilitate access to the database, for storage and retrieval of table data.

As further illustrated in FIG. 1, in accordance with an embodiment, the system can include a unique ID server (service) 200, referred to herein in some embodiments as a UniqueI D server, for use with an enterprise application environment, that operates in a centralized manner, and supports existing enterprise application needs and additional requirements with regard to scalability and robustness.

In accordance with an embodiment, the unique ID server can provide, for example, an individual single unique ID, or a single sequence or a sequence of bulk IDs, without breaking sequence consistency in the database.

In accordance with various embodiment, the unique ID server can be provided, for example, as a microservice or service that can be deployed and run independently, or as a sub-service provided inside a larger service layer.

Figure 2:
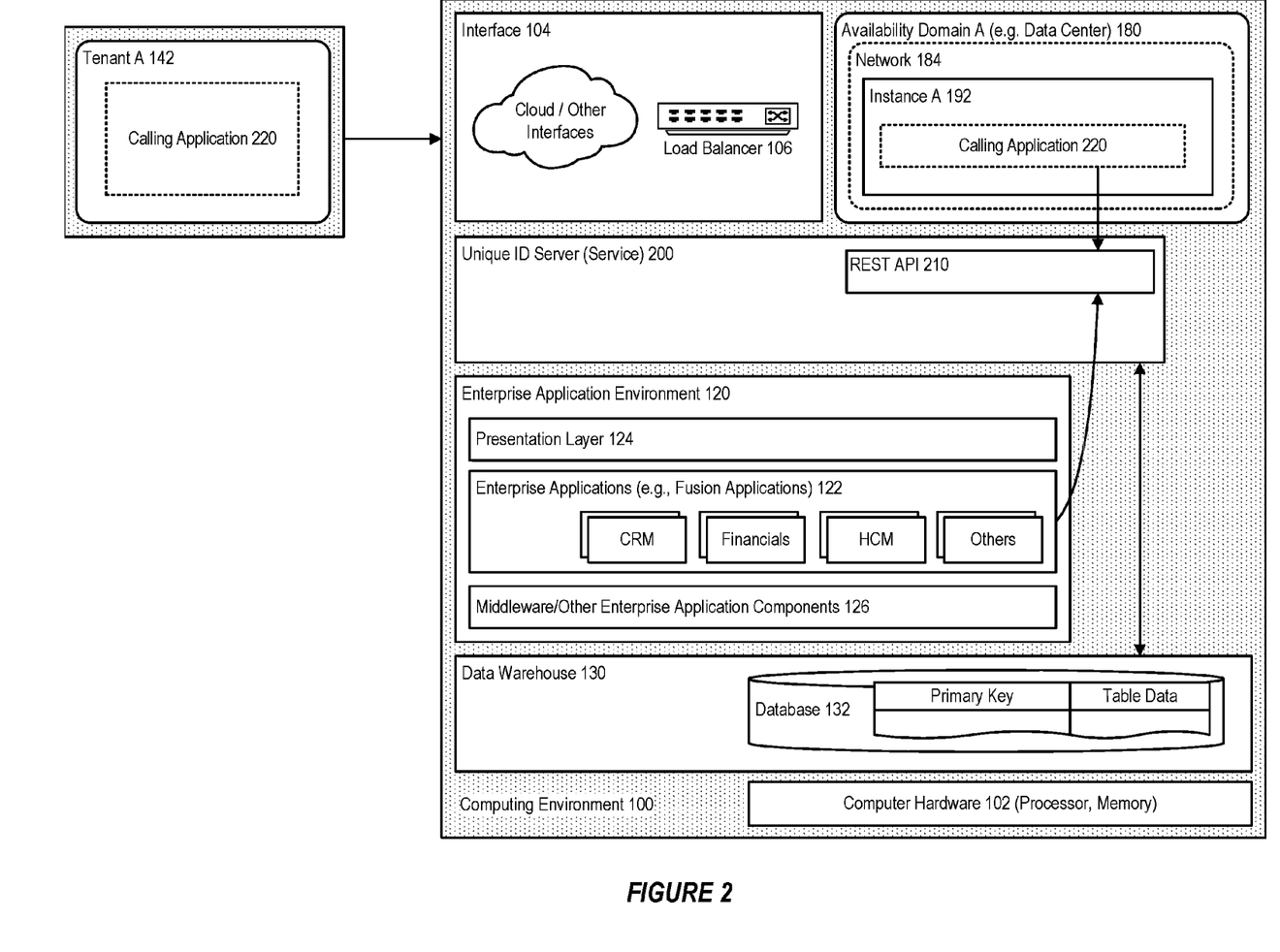
FIG. 2 further illustrates a system for providing unique identifiers for use with enterprise application environments, in accordance with an embodiment.

FIG. 2 further illustrates a system for providing unique identifiers for use with enterprise application environments, in accordance with an embodiment.

As illustrated in FIG. 2, in accordance with an embodiment, the unique ID server (service) can include a REST-based application program interface (API) 210 that enables a calling application 220 to send a sequence request to the unique ID server. A calling application can reserve and/or request, via the unique ID service, sequences of unique IDs, ahead of time, either as a single sequence or bulk sequence.

Figure 3:
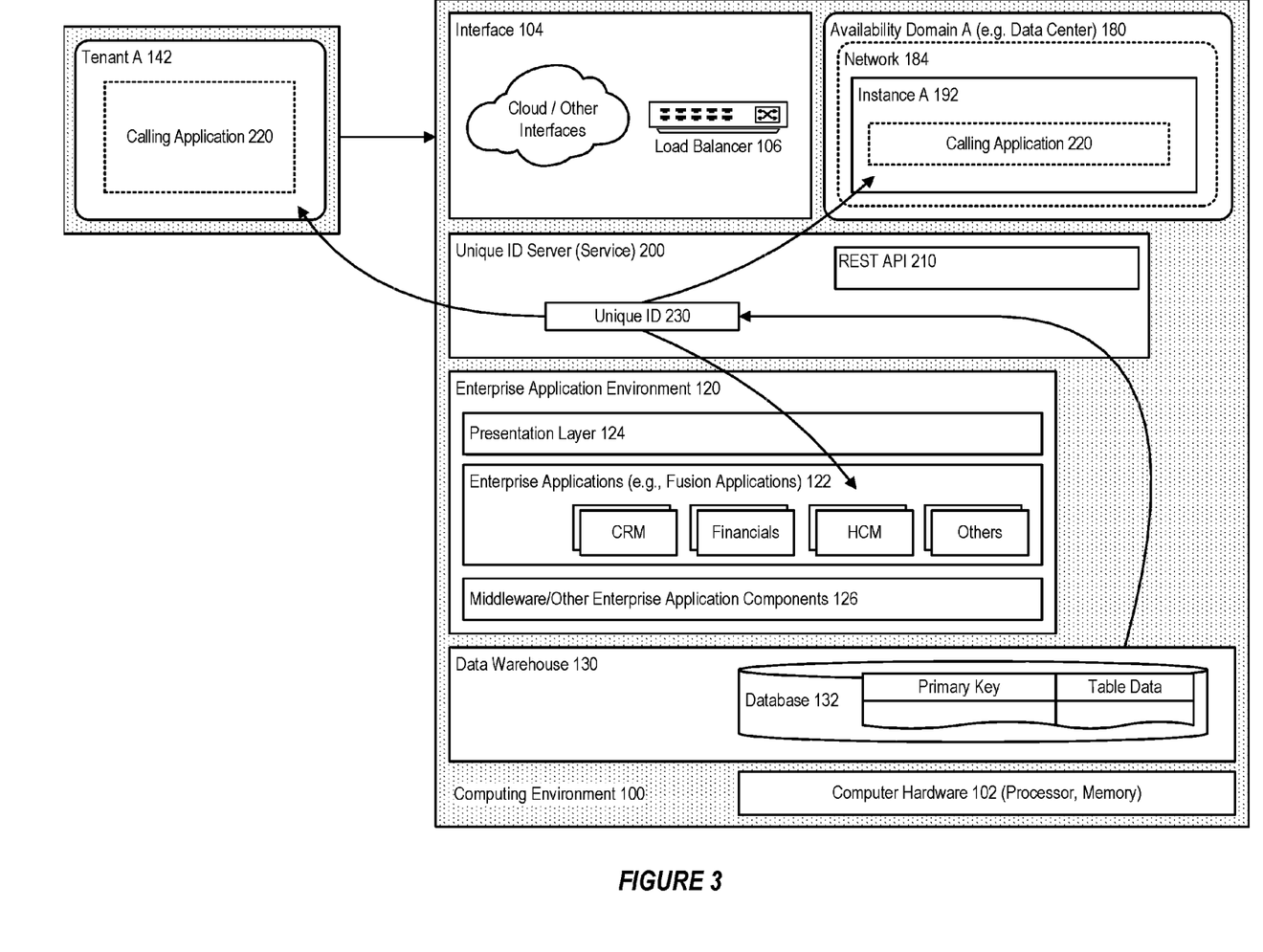
FIG. 3 further illustrates a system for providing unique identifiers for use with enterprise application environments, in accordance with an embodiment.

FIG. 3 further illustrates a system for providing unique identifiers for use with enterprise application environments, in accordance with an embodiment.

As illustrated in FIG. 3, in accordance with an embodiment, the unique ID server receives sequences of one or more unique ID 230 from the database, for use in responding to the request.

Figure 4:
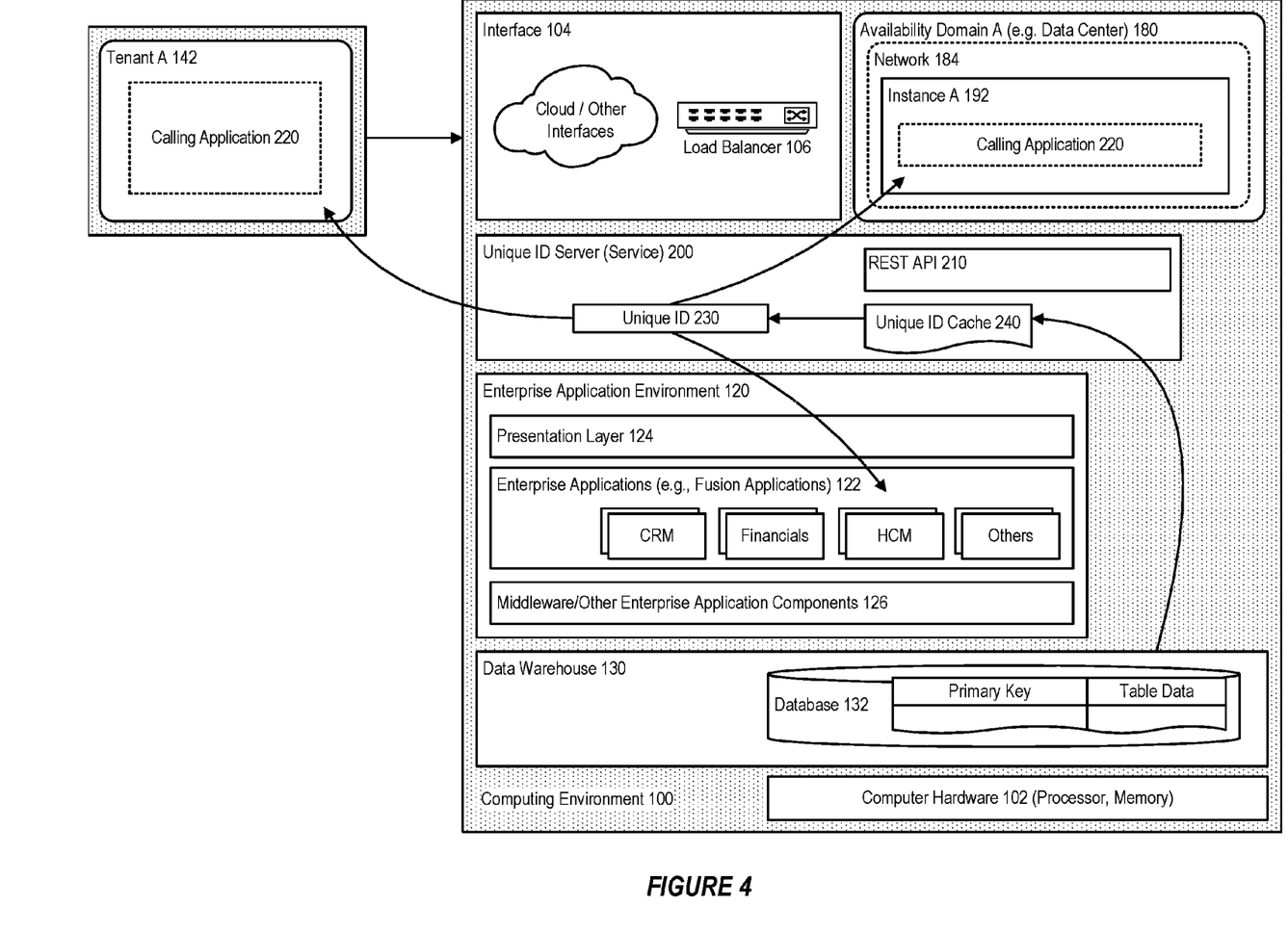
FIG. 4 further illustrates a system for providing unique identifiers for use with enterprise application environments, in accordance with an embodiment.

FIG. 4 further illustrates a system for providing unique identifiers for use with enterprise application environments, in accordance with an embodiment.

As illustrated in FIG. 4, in accordance with an embodiment, the unique ID server can include a unique ID cache 240 that caches sequences of unique IDs received from the database, for use in responding to a subsequent request.

Figure 5:
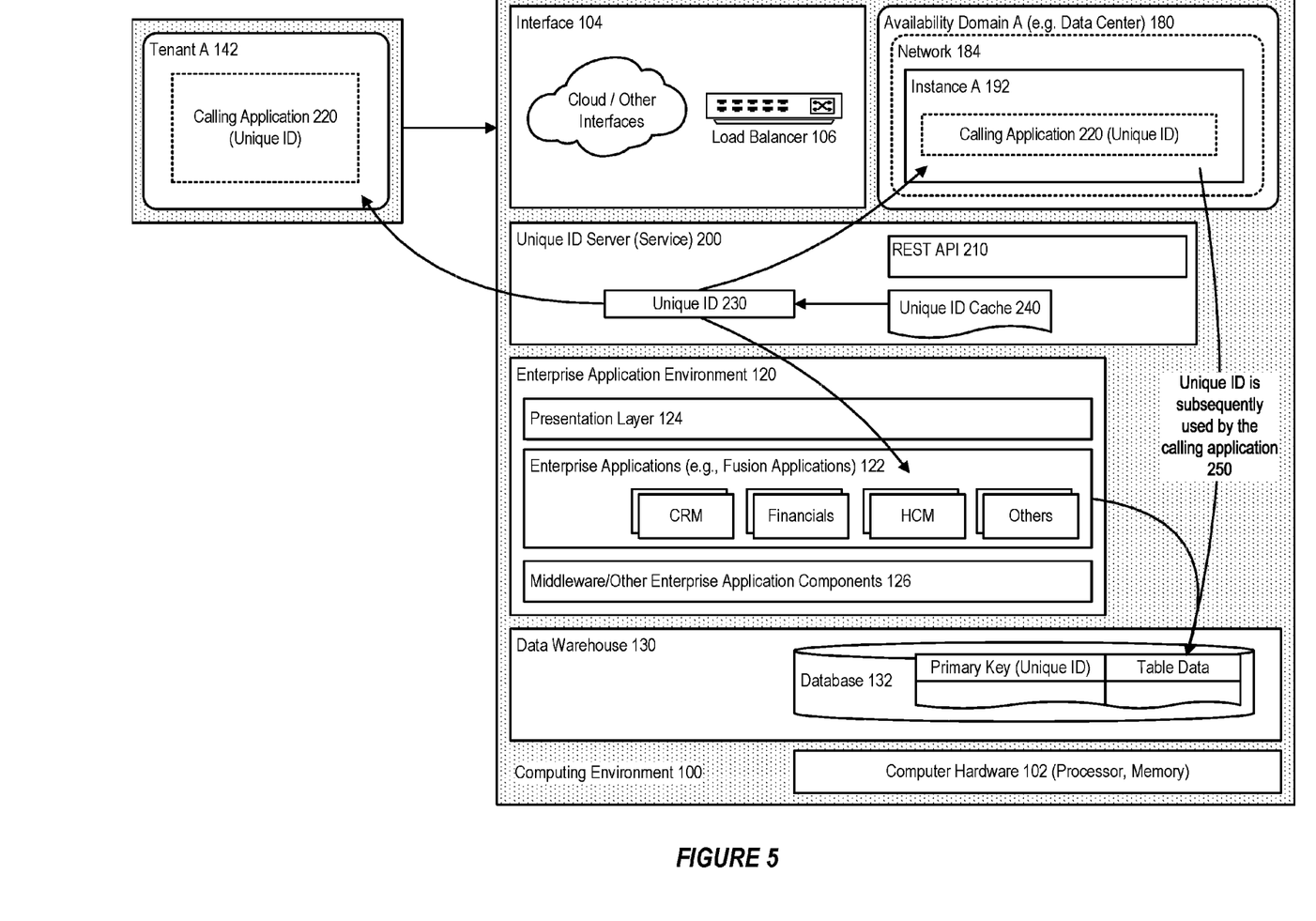
FIG. 5 further illustrates a system for providing unique identifiers for use with enterprise application environments, in accordance with an embodiment.

FIG. 5 further illustrates a system for providing unique identifiers for use with enterprise application environments, in accordance with an embodiment.

As illustrated in FIG. 5, in accordance with an embodiment, the unique ID can be subsequently used 250 within the enterprise application environment for various purposes.

Figure 6:
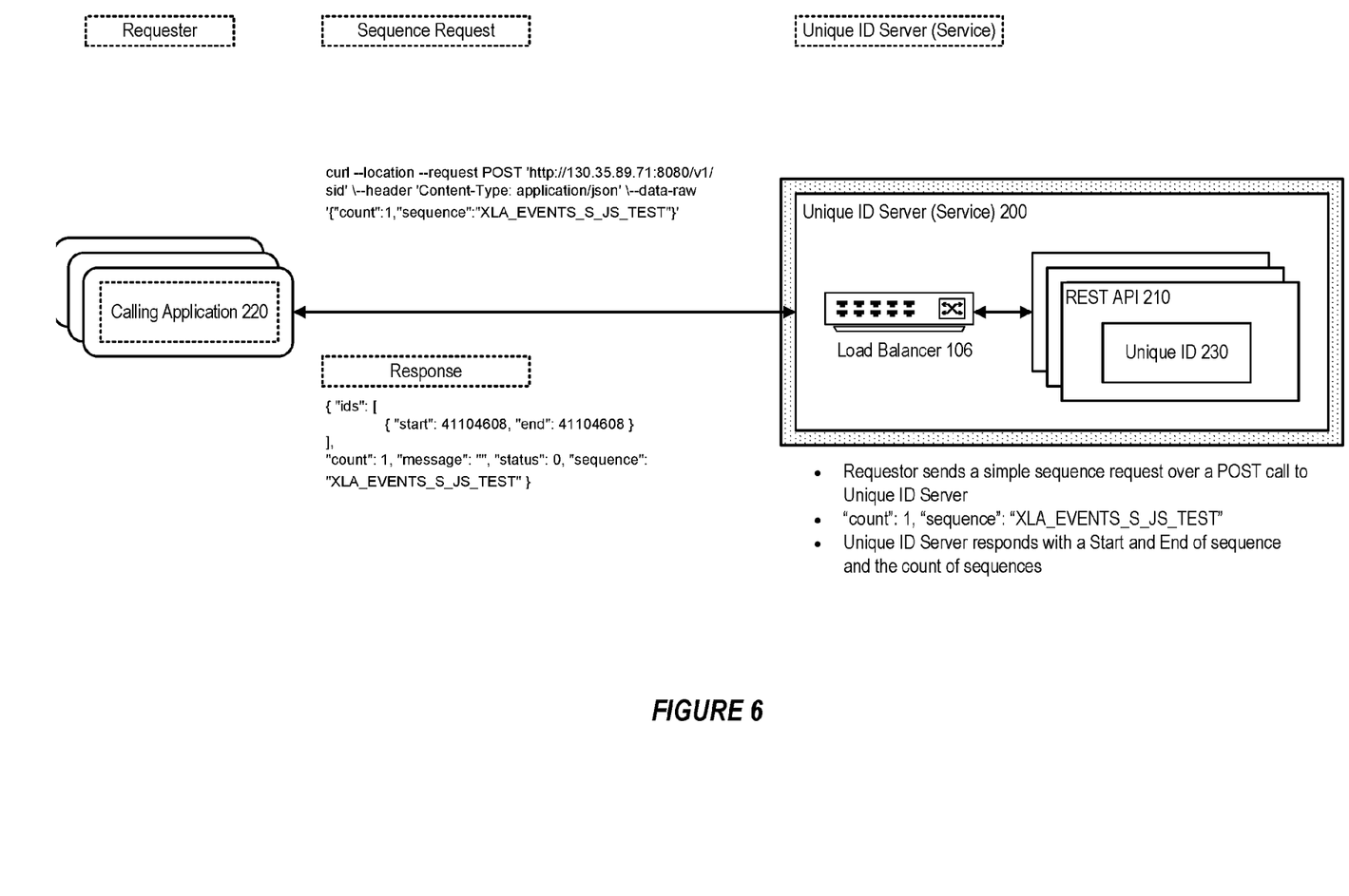
FIG. 6 illustrates an example of providing unique identifiers for use with enterprise application environments, in accordance with an embodiment.

FIG. 6 illustrates an example of providing unique identifiers for use with enterprise application environments, in accordance with an embodiment.

As illustrated in FIG. 6, in accordance with an embodiment: an (e.g., Oracle) database sequence is leveraged for issuing unique ID sequences. A monolith sequence can be re-used. A sequence can be issued in bulk.

In accordance with an embodiment, a cluster of Java REST application (unique ID servers) can be running, for example as Helidon based web applications, or other types of microservices or services.

In accordance with an embodiment, the unique ID server gets the initial sequences from the database and caches the sequences.

In accordance with an embodiment, the unique ID server asynchronously replenishes the sequence cache, on a certain threshold. If a unique ID server crashes, it takes all the sequences down along with it.

In accordance with an embodiment, the system can expose two endpoints, for example:
  http://../uid Provides legacy support, ID issued from s_event_row_id table
  http://../sid The caller can provide a sequence name to fetch In accordance with an embodiment, a caller can reserve sequences ahead of time. The caller can request for a single sequence or a bulk sequence. The caller can retrieve partial sequences in case of bulk sequence request.

In accordance with an embodiment, sequences may be re-used, if they were not issued to any caller.

In accordance with an embodiment, the calling application can request for a sequence by passing the sequence name. The caller can reserve sequence ahead of time by sending a reserve call. The caller should send an 'ack' to expire the issued sequences. If no 'ack' is received, after a pre-defined period those sequences will be auto-expired FIG. 7 illustrates another example of providing unique identifiers for use with enterprise application environments, in accordance with an embodiment.

Figure 7:
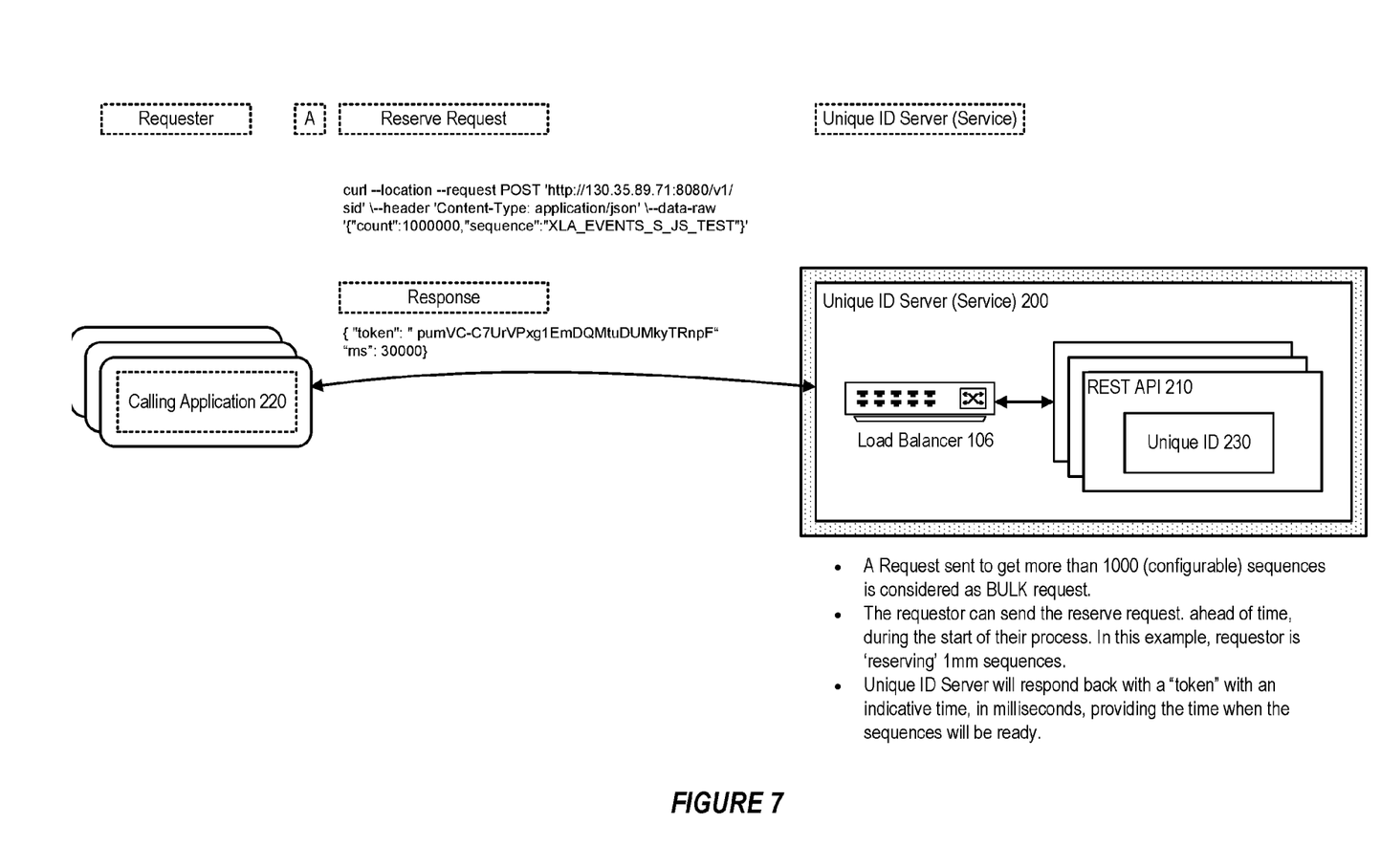
FIG. 7 illustrates another example of providing unique identifiers for use with enterprise application environments, in accordance with an embodiment.

As illustrated in FIG. 7, in accordance with an embodiment, a requestor sends a simple sequence request over a POST call to the unique ID server. In this example, the sequence request includes a "count": 1, "sequence": "XLA_EVENTS_S_JS_TEST".

In accordance with an embodiment, the unique ID server responds with a Start and End of sequence, and the count of sequences.

Figure 8:
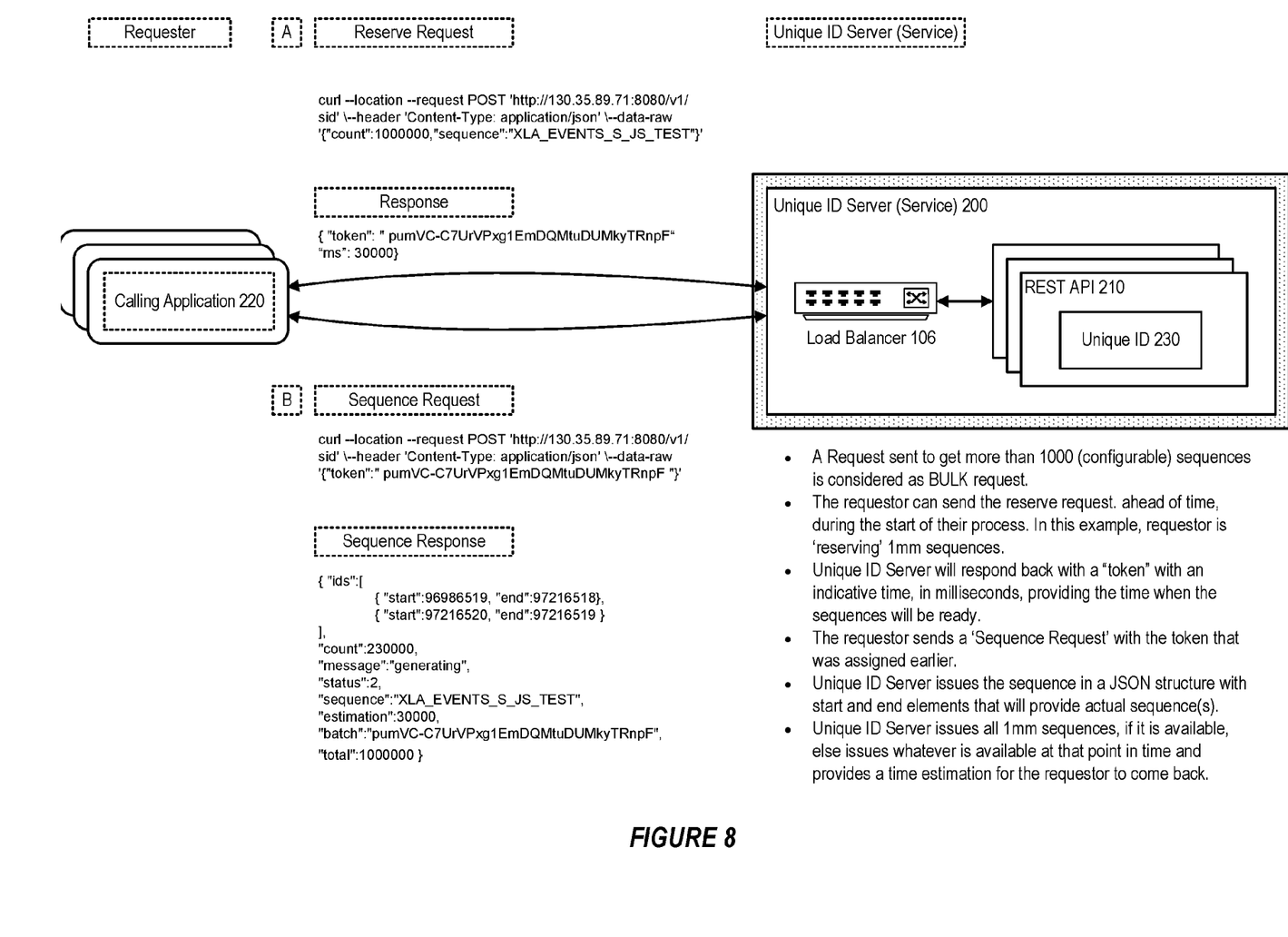
FIG. 8 further illustrates another example of providing unique identifiers for use with enterprise application environments, in accordance with an embodiment.

FIG. 8 further illustrates another example of providing unique identifiers for use with enterprise application environments, in accordance with an embodiment.

As illustrated in FIG. 8, in accordance with an embodiment, a Request sent to get more than, e.g., 1000 (configurable) sequences is considered as BULK request.

In accordance with an embodiment, the requestor can send the reserve request, ahead of time, during the start of their process. In this example, the requestor is 'reserving' 1000000 sequences.

In accordance with an embodiment, the unique ID server will respond back with a "token" with an indicative time, in milliseconds, providing the time when the sequences will be ready.

In accordance with an embodiment, the requestor sends a 'Sequence Request' with the token that was assigned earlier.

In accordance with an embodiment, the unique ID server issues the sequence, for example in a JSON structure, with start and end elements that will provide actual sequence(s).

In accordance with an embodiment, the unique ID server issues all (in this example 1000000) sequences, if it is available, else issues whatever is available at that point in time and provides a time estimation for the requestor to come back.

Example Use With Data Analytics Environments

In accordance with an embodiment, the approach described herein for providing unique identifiers can be used with other types of computing environments, including other types of data analytics environments, wherein data is stored in a shared database for use by software applications.

Figure 9:
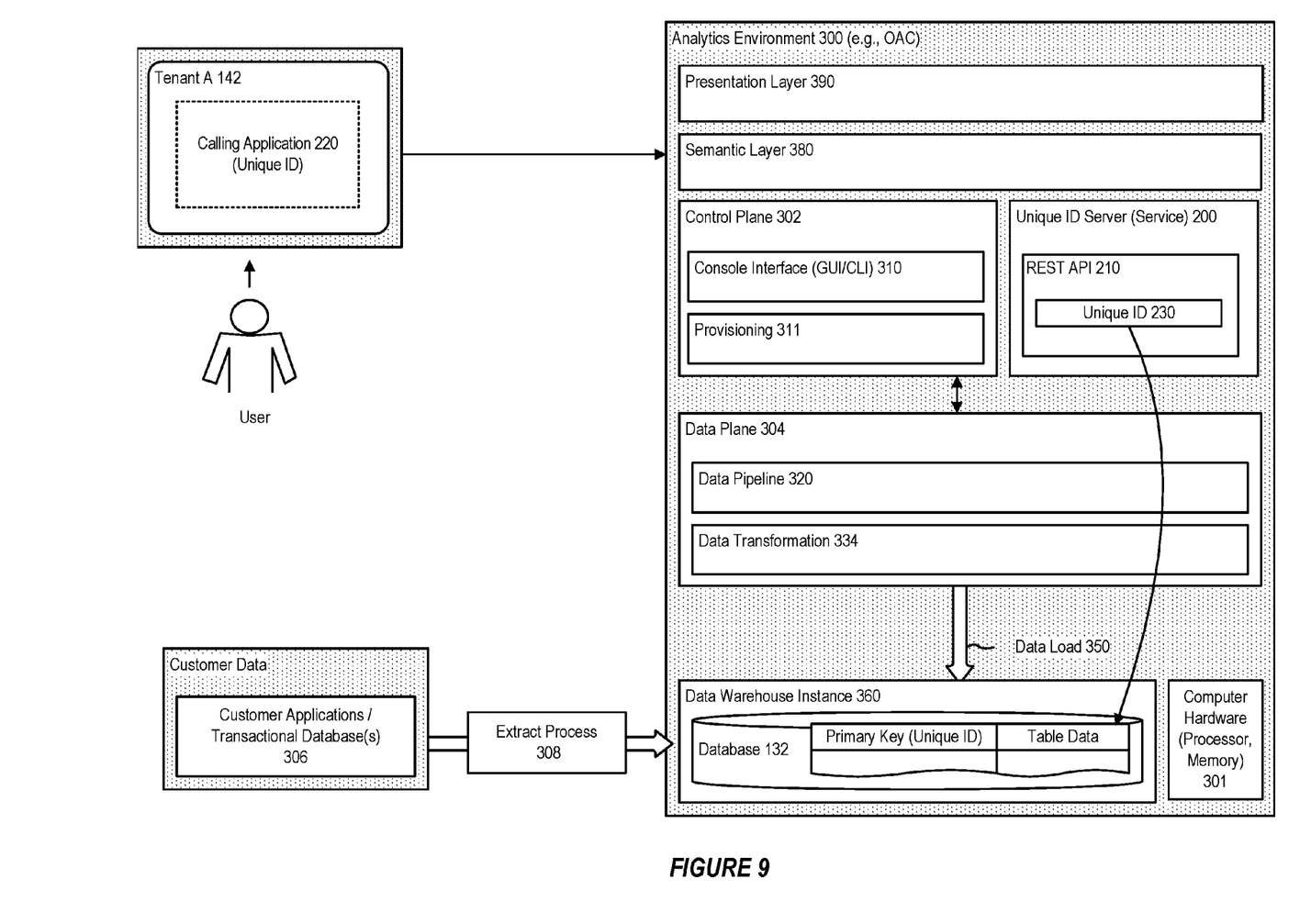
FIG. 9 illustrates an example of providing unique identifiers in a data analytics environment, in accordance with an embodiment.

FIG. 9 illustrates an example of providing unique identifiers in a data analytics environment, in accordance with an embodiment.

The example shown and described in FIG. 9 is provided for purposes of illustrating an example of one type of analytic applications or data analytics environment. In accordance with an embodiment, the components and processes illustrated in FIG. 9, and as further described herein with regard to various other embodiments, can be provided as software or program code executable by a computer system or other type of processing device. For example, the components and processes described herein can be provided by a cloud computing system, or other suitably-programmed computer system.

As illustrated in FIG. 9, in accordance with an embodiment, an analytics environment 300 can be provided by, or otherwise operate at, a computer system having a computer hardware (e.g., processor, memory) 301, and including one or more software components operating as a control plane 302, and a data plane 304, and providing access to a data warehouse instance 360 and database.

In accordance with an embodiment, the control plane operates to provide control for cloud or other software products offered within the context of a SaaS or cloud environment, such as, for example, an Oracle Analytics Cloud environment. For example, in accordance with an embodiment, the control plane can include a console interface 310 that enables access by a customer (tenant) and/or a cloud environment having a provisioning component 311.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

In accordance with an embodiment, the provisioning component can be used to update or edit a data warehouse instance, and/or an ETL process that operates at the data plane, for example, by altering or updating a requested frequency of ETL process runs, for a particular customer (tenant).

In accordance with an embodiment, the data plane can include a data pipeline or process layer 320 and a data transformation layer 334, that together process operational or transactional data from an organization's enterprise software application or data environment, such as, for example, business productivity software applications provisioned in a customer's (tenant's) SaaS environment.

In accordance with an embodiment, the data transformation layer can include a data model, such as, for example, a knowledge model (KM), or other type of data model, that the system uses to transform data into a model format understood by the analytics environment.

In accordance with an embodiment, a data pipeline or process can be scheduled to execute at intervals (e.g., hourly/daily/weekly) to extract 308 transactional data from an enterprise software application or data environment, such as, for example, business productivity software applications and corresponding transactional databases 306.

In accordance with an embodiment, after transformation of the extracted data, the data pipeline or process can execute a warehouse load procedure 350, to load the transformed data into the data warehouse instance.

In accordance with an embodiment, the data warehouse can include a default analytic applications schema (referred to herein in accordance with some embodiments as an analytic warehouse schema) and, for each customer (tenant) of the system, a customer schema. Different customers of a data analytics environment may have different requirements with regard to how their data is classified, aggregated, or transformed, for purposes of providing data analytics or business intelligence data, or developing software analytic applications.

In accordance with an embodiment, to support different customer requirements as to how their data is classified, aggregated, or transformed, a semantic layer 380 can include data defining a semantic model of a customer's data; which is useful in assisting users in understanding and accessing that data using commonly-understood business terms; and provide custom content to a presentation layer 390.

In accordance with an embodiment, the presentation layer can enable access to the data content using, for example, a software analytic application, user interface, dashboard, key performance indicators (KPI's), visualizations; or other type of report or interface as may be provided by products such as, for example, Oracle Analytics Cloud.

In accordance with an embodiment, a user/developer can interact with a client computer device that includes a computer hardware (e.g., processor, storage, memory), user interface, and software application. A query engine (e.g., OBIS) operates to serve analytical queries within, e.g., an Oracle Analytics Cloud environment, pushes down operations to supported databases, and translates business user queries into appropriate database-specific query languages.

Figure 10:
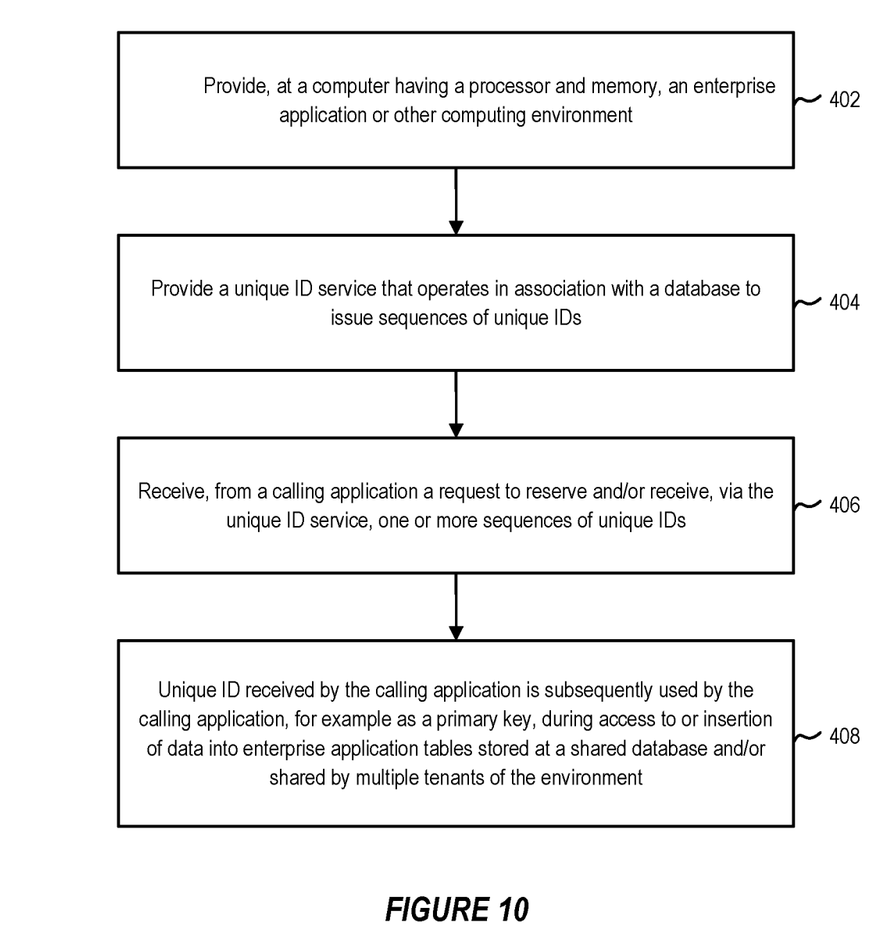
FIG. 10 illustrates a method or process for providing unique identifiers for use with enterprise application environments, in accordance with an embodiment.

In accordance with an embodiment, the approach described herein for providing unique identifiers can be used with data analytics or computing environments such as those shown in FIG. 9, to provide access by a tenant's applications to data stored in the shared data warehouse FIG. 10 illustrates a method or process for providing unique identifiers for use with enterprise application environments, in accordance with an embodiment.

As illustrated in FIG. 10, in accordance with an embodiment, at step 402, an enterprise application or other computing environment is provided at a computer having a processor and memory.

At step 404, a unique ID service is provided, that operates in association with a database to issue sequences of unique IDs.

At step 406, the system can receive, from a calling application a request to reserve and/or receive, via the unique ID service, one or more sequences of unique IDs.

At step 408, a unique ID received by the calling application is subsequently used by the calling application, for example as a primary key, during access to or insertion of data into enterprise application tables stored at a shared database and/or shared by multiple tenants of the environment.

Additional Features

In accordance with an embodiment, technical features of the system include, for example: support for asynchronous replenishment of IDs without making the caller wait for IDs during request; support for both bulk and singular ID requests; and support for advance reservation of IDs before the actual need for such IDs.

In accordance with an embodiment, additional advantages of the described approach include, for example: the caller does not have to wait for the ID when the actual request is issued; the ID is issued from an already pre-populated cache in the Java REST server; and there is no server roundtrip to the database, which typically slows down.

In accordance with an embodiment, for example in a Fusion Applications (FA) environment, the described approach supports a centralized and efficient unique ID provider for Primary Key usage during insert into FA tables, that supports both monolith ADF application and Spectra based Fusion Cloud applications.

In accordance with an embodiment, the unique ID can satisfy various requirements, for example: a capability to generated unique ID across an application; the ID is numeric and not alpha-numeric or hex value; the ID does not have any business meaning attached, it will be a running sequence number; the ID can be called by multiple parts of the application concurrently; the ID service should be high resilient, fault tolerant and should handle peaks gracefully with not much of a wait time for the callers; and a capability to generate thousands of IDs per second with a fast response rate of a few milliseconds.

In accordance with various embodiments, additional features can include, for example:

Sequence Reuse: Unused sequences are re-used, used sequences are never re-used.

Expiring Sequences: On receiving an 'ack' call from the requestor, all sequences in that batch will be expired. If no 'ack' call was made, those sequences are expired after, for example, 24 hours.

Partial delivery of sequences: Sequences that are available in the unique ID server cache will be immediately delivered to the caller, while the server in an asynchronous fashion replenishes new sequences from the database.

Product teams uptake: A product team can easily uptake this as they just need to send the appropriate request to the endpoint and start to use the ID.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of a data analytics environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing unique identifiers for use with enterprise software application environments, comprising:
   a computer having a processor, memory, and enterprise application environment operating thereon; and
   a unique identifier (ID) service that operates in association with a database to issue sequences of unique identifiers (IDs), wherein the unique ID service:
      caches a plurality of sequences of unique IDs provided by the database, and
      provides an interface for receiving requests from calling applicants for unique IDs, for use with the database;
   wherein a calling application can reserve and/or request, via the unique ID service, one or more sequences of unique IDs, wherein in response the unique ID service reserves the one or more sequences of unique IDs, from its cached plurality of sequences of unique IDs provided by the database, for use by the calling application in accessing or inserting data at one or more tables stored at the database; and
   wherein a unique ID received by the calling application is subsequently used by the calling application within the enterprise application environment as a key during the accessing or inserting of the data at the one or more tables stored at the database.

2. The system of claim 1, wherein the calling application can reserve and/or request that a sequence of unique IDs is to be provided as a single sequence or bulk sequence.

3. The system of claim 1, wherein the enterprise application environment is provided within a cloud or shared computing environment that provides access to shared resources by tenants, wherein the software applications operated by the tenants access data stored in the database.

4. The system of claim 1, wherein the unique ID, provided by the unique ID service to a calling application, is then used by the calling application in accessing the data stored in the database.

5. The system of claim 1, wherein the unique ID, provided to a particular calling application, is used as a primary key (table column identifier) during access to or insertion of data into enterprise application tables that are stored at the database and shared by the tenants of the enterprise application environment.

6. The system of claim 1, wherein the unique ID service provides reservation of unique IDs to a calling application, in advance of the calling application subsequently using the unique IDs to access or insert data into the enterprise application tables.

7. The system of claim 1, wherein the unique ID service is provided at one or more servers, each having a REST interface and a cache for storage of unique IDs provided by the database, wherein a unique ID is issued from a pre-populated cache without a server roundtrip to the database, and wherein the unique ID service replenishes its cache periodically or at certain thresholds.

8. The system of claim 1, wherein the REST interface provides a plurality of endpoints, including a first endpoint that provides support for legacy enterprise applications requesting database IDs, and a second endpoint that receives requests from the calling applications to fetch sequences of unique IDs.

9. The system of claim 1, wherein in response to a request to reserve a sequence of unique IDs, the unique ID service responds with a token providing the time when the sequences will be ready, for use by the requestor.

10. The system of claim 1, wherein the unique ID service issues a sequences of unique IDs as a JSON or other data structure.

11. A method for providing unique identifiers for use with enterprise software application environments, comprising:
   providing, at a computer having a processor and memory, an enterprise application environment; and
   providing a unique identifier (ID) service that operates in association with a database to issue sequences of unique identifiers (IDs), wherein the unique ID service:
      caches a plurality of sequences of unique IDs provided by the database, and
      provides an interface for receiving requests from the calling applications for unique IDs, for use with the database;
   wherein a calling application can reserve and/or request, via the unique ID service, one or more sequences of unique IDs, wherein in response the unique ID service reserves the one or more sequences of unique IDs, from its cached plurality of sequences of unique IDs provided by the database, for use by the calling application in accessing or inserting data at one or more tables stored at the database; and
   wherein a unique ID received by the calling application is subsequently used by the calling application within the enterprise application environment as a key during the accessing or inserting of the data at the one or more tables stored at the database.

12. The method of claim 11, wherein the calling application can reserve and/or request that a sequence of unique IDs is to be provided as a single sequence or bulk sequence.

13. The method of claim 11, wherein the enterprise application environment is provided within a cloud or shared computing environment that provides access to shared resources by tenants, wherein the software applications operated by the tenants access data stored in the database.

14. The method of claim 11, wherein the unique ID, provided by the unique ID service to a calling application, is then used by the calling application in accessing the data stored in the database.

15. The method of claim 11, wherein the unique ID, provided to a particular calling application, is used as a primary key (table column identifier) during access to or insertion of data into enterprise application tables that are stored at the database and shared by the tenants of the enterprise application environment.

16. The method of claim 11, wherein the unique ID service provides reservation of unique IDs to a calling application, in advance of the calling application subsequently using the unique IDs to access or insert data into the enterprise application tables.

17. The method of claim 11, wherein the unique ID service is provided at one or more servers, each having a REST interface and a cache for storage of unique IDs provided by the database, wherein a unique ID is issued from a pre-populated cache without a server roundtrip to the database, and wherein the unique ID service replenishes its cache periodically or at certain thresholds.

18. The method of claim 11, wherein the REST interface provides a plurality of endpoints, including a first endpoint that provides support for legacy enterprise applications requesting database IDs, and a second endpoint that receives requests from the calling applications to fetch sequences of unique IDs.

19. The method of claim 11, wherein in response to a request to reserve a sequence of unique IDs, the unique ID service responds with a token providing the time when the sequences will be ready, for use by the requestor.

20. A non-transitory computer readable storage medium having instructions thereon, which when read and executed by a computer including one or more processors cause the computer to perform a method comprising:

providing an enterprise application environment; and providing a unique identifier (ID) server or service that operates in association with a database to issue unique ID sequences, wherein the unique ID server or service:

caches a plurality of sequences of unique identifiers (IDs) provided by the database, and provides an interface for receiving requests from calling applications for unique IDs, for use with the database;

wherein a calling application can reserve or request, via the unique ID server or service, one or more sequences of unique IDs, wherein in response the unique ID server or service reserves the one or more sequences of unique IDs, from its cached plurality of sequences of unique IDs provided by the database, for use by the calling application in accessing or inserting at one or more tables stored at the database; and wherein a unique ID received by the calling application is subsequently used by the calling application within the enterprise application environment as a key during the accessing or inserting of the data at the one or more tables stored at the database.

* * * * *

UNITED STATES PATENT AND TRADEMARK OFFICE
CERTIFICATE OF CORRECTION

Page 1 of 1

PATENT NO. : 11,716,396 B1
APPLICATION NO. : 17/588915
DATED : August 1, 2023
INVENTOR(S) : Krishnan et al.

It is certified that error appears in the above-identified patent and that said Letters Patent is hereby corrected as shown below:

In the Specification

In Column 3, Line 64, delete "Uniquel D" and insert -- Unique ID --, therefor.

In the Claims

In Column 9, Line 16, in Claim 1, delete "applicants" and insert -- applications --, therefor.

In Column 10, Line 15, in Claim 11, after "from" delete "the".

In Column 11, Line 24, in Claim 20, after "inserting" insert -- data --, therefor.

Signed and Sealed this
Sixth Day of May, 2025

Coke Morgan Stewart
*Acting Director of the United States Patent and Trademark Office*